United States Patent [19]

Beshoory

[11] Patent Number: 4,817,745

[45] Date of Patent: Apr. 4, 1989

[54] THERMOGRAVIMETRIC BALANCE

[76] Inventor: Joseph E. Beshoory, 10926 Sagebluff, Houston, Tex. 77089

[21] Appl. No.: 135,710

[22] Filed: Dec. 21, 1987

[51] Int. Cl.⁴ .................. G01G 7/00; G01G 23/00; G01N 25/00
[52] U.S. Cl. .................................. 177/212; 177/245; 374/14
[58] Field of Search ................... 177/212, 245; 374/14

[56] References Cited

U.S. PATENT DOCUMENTS

| | | | |
|---|---|---|---|
| 3,373,598 | 3/1968 | Johnson et al. | 374/14 |
| 3,554,001 | 1/1971 | Norem | 374/14 |
| 3,610,354 | 10/1971 | Sieswerda | 177/212 X |
| 3,717,210 | 2/1973 | Sieswerda | 177/212 X |
| 4,625,819 | 12/1986 | O'Neill | 177/212 |

Primary Examiner—George H. Miller, Jr.
Attorney, Agent, or Firm—Robert W. B. Dickerson

[57] ABSTRACT

A thermogravimetric balance includes a bridge assembly carried by a torque motor, said bridge assembly having, at one end, riser mechanism for carrying a sample pan, and at the other end, first magnetic means for regulating said bridge; further magnetic means positioned intermediate said riser and said first magnetic means for further regulating said bridge; and a furnace device movably encompassing the sample pan.

8 Claims, 4 Drawing Sheets

THERMOGRAVIMETRIC BALANCE

BACKGROUND OF THE INVENTION

Thermal or thermogravimetric balances have commonly been used to analyze and measure the thermal properties of materials, such as weight loss. Decomposition that may result is determined by the balance instrumentation. Various motor mechanisms have been developed or adapted as an instrumentation component. Torque motors having taut-band movements, represent recent developments. Beam vibrations, or oscillations, have interferred with accuracy. Sample loading requirements have clashed with the needs to provide a heat source. This invention addresses all these problems.

DESCRIPTION OF A PREFERRED EMBODIMENT

Figure 1:
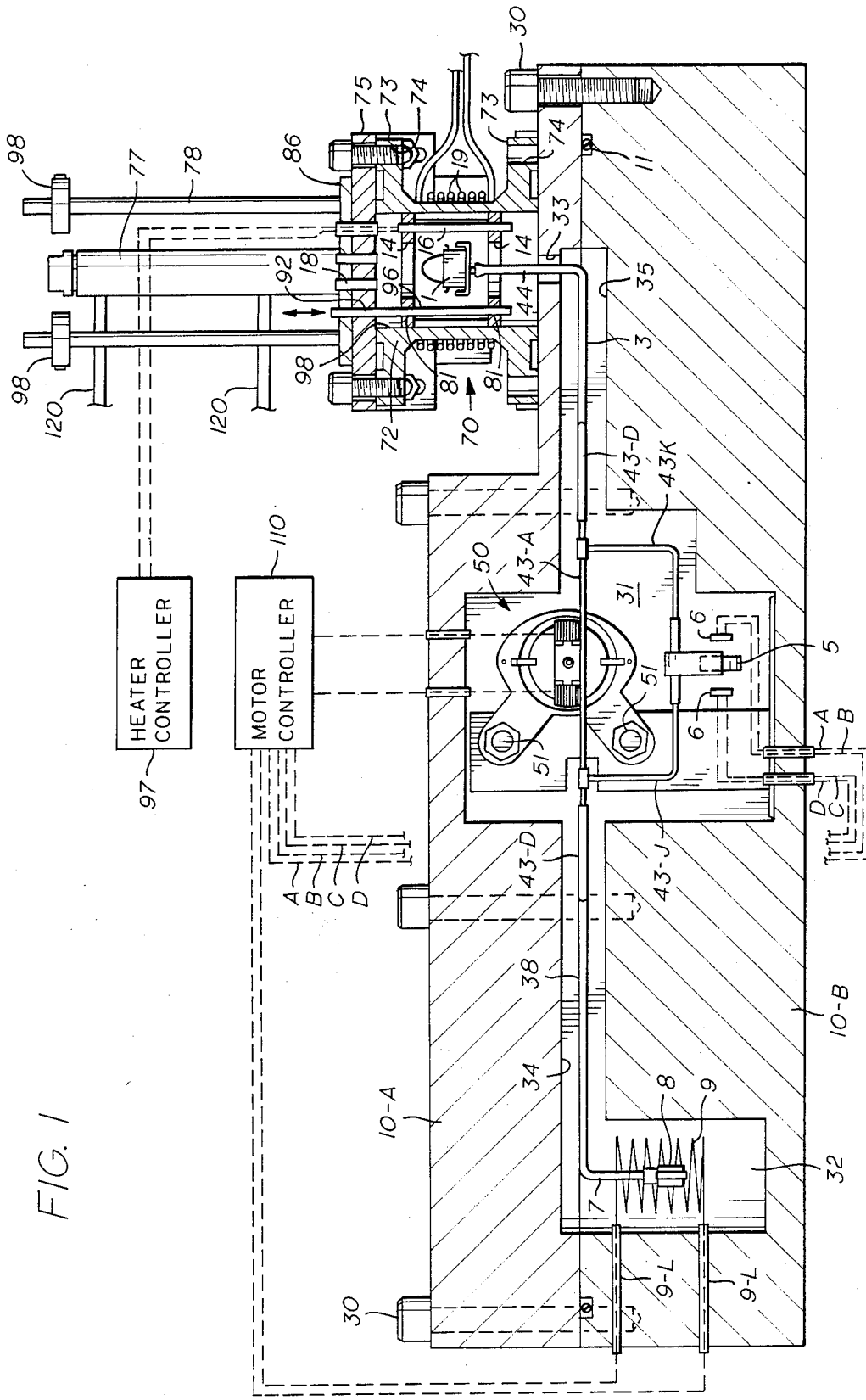
FIG. 1 is a somewhat schematic, vertical section through the housing of the invention.
Figure 3:
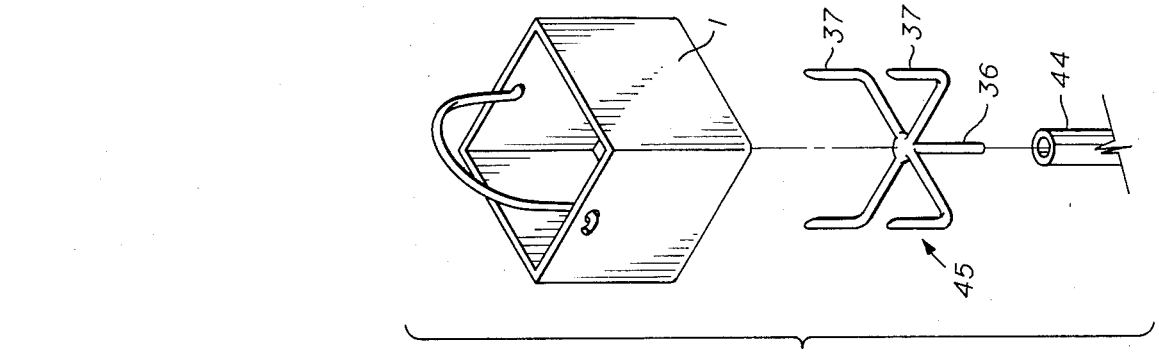
FIG. 3 is an exploded perspective of the pedestal, support and sample pan.

The housing for the balance which comprises this invention, includes upper and lower hollow block portions 10-A and 10-B, respectively. When joined, as by a series of peripherally placed bolts 30, a central cavity 31 is in communication with laterally extended cavity 32 and with lateral bore 33 by virtue of axial passageways 34,35, respectively. O-ring seal 11 permits the housing to be pressurized.

Figure 2:
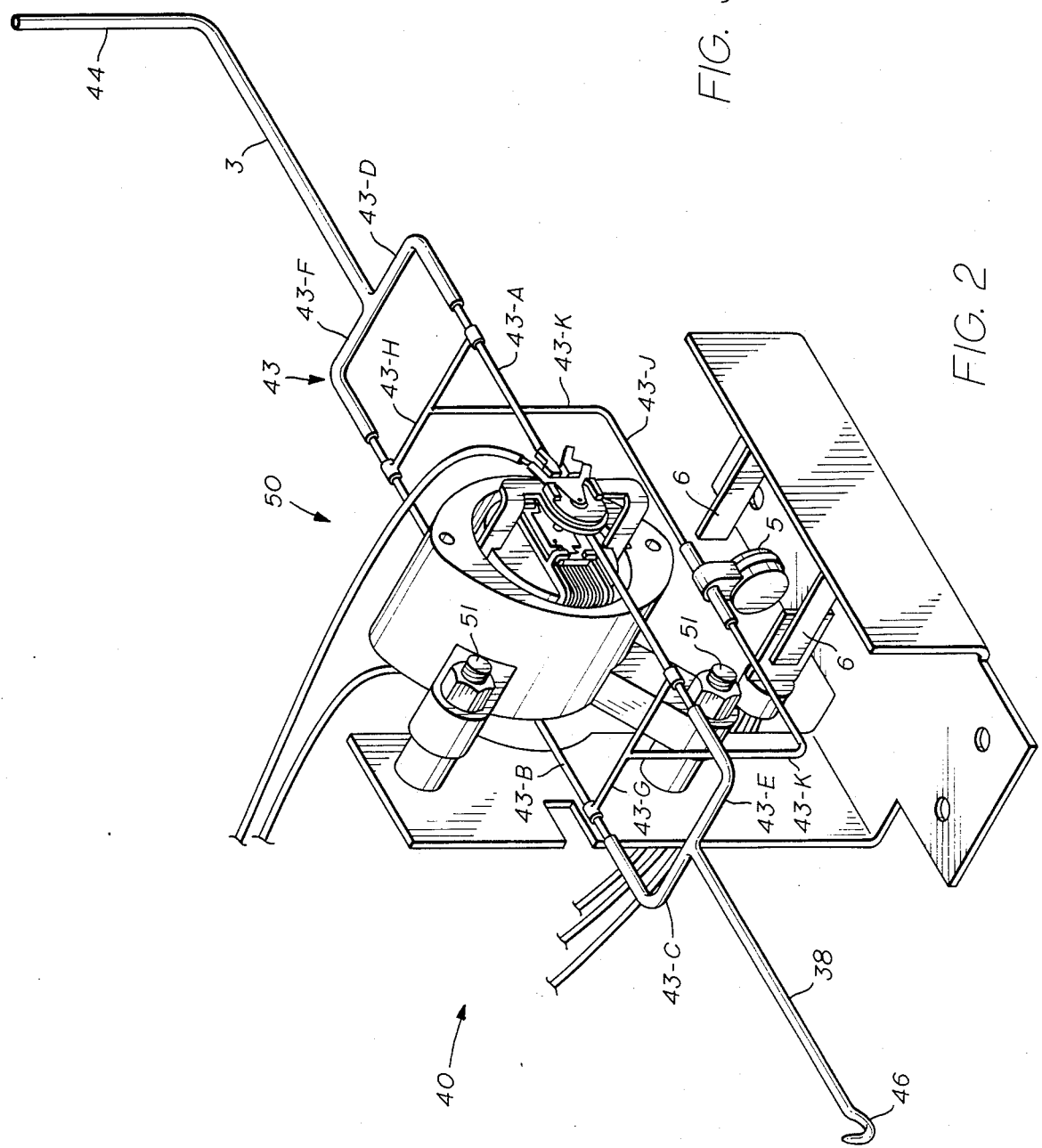
FIG. 2 is a perspective of the motor and bridge assembly.

A bridge assembly, see FIG. 2, is generally indicated at 40. Essentially such assembly includes opposed beams 3, 38, linked by central bridge 43, substantially all of which may be fabricated of quartz or of ceramic material. Beam 3, the sample beam, includes an upturned end 44, the tip of which is hollow, forming a pedestal. Received within said hollow tip is stem 36 of pan, or sample container, support 45. Said support includes a plurality of fingers 37 radially extending from stem 36. Such fingers form a base on which the basket-like, sample container, or pan, 1 may be removably placed.

Opposite from beam 3, rear or counter beam 38 extends through passageway 34, into cavity 32, and may include either a hook 46 (see FIG. 2) or a downturned tip 7 (see FIG. 1), at the reference end. Either hung from said hook 46, or secured to said downturned tip 7, would be a magnetic bar 8. Said magnet is suspended within, and also movable with respect to current-carrying, stablization damping coil 9. Said coil could be connected by leads 9-L, across contacts provided by generally described bridge controller 110. Such controller would emit a bridge controlling voltage to motor 50 (subsequently described) as a partial function of the relative positions of magnet 5 and Hall detectors 6. Such coil 9 may regulate the bridge lift capability, by attracting or repelling magnet 8, and may thereby assist in taring or zeroing the balance, may overcome buoyancy tendencies, and may provide necessary dampening or filtering for the bridge. Thus, such coil functions as an electro-magnetic-mechanical dampener in place of a counter weight in the vertical plane, and prevents the bridge from swaying in the horizontal plane.

Central bridge 43 comprises side struts 43-A, 43-B. Opposed pairs of ends of each said strut are each telescopingly received by one of a pair of U-shaped end pieces 43-C, 43-D. Each said end piece includes a web, namely 43-E, 43-F. Extending between, and connecting, the two side struts 43-A, 43-B, near their junctures with end pieces 43-C, 43-D, are a pair of support struts 43-G, 43-H. Downwardly depending centrally of each said support strut, is a leg 43-K of a cradle, said legs being joined at their ends opposite said support struts, by cross-piece 43-J. Said cross-piece 43-J includes a T-fitting centrally thereof, the central leg of which fitting is secured to a further magnet 5. A pair of Hall effect Detectors or sensors 6 are shown to be positioned adjacent magnet 5, and would be within the magnetic field of said magnet. These detectors would be electrically connected, as by leads A-B, C-D, to bridge controller 110, such as to input amplifier 110-A. Signals therefrom, resulting from movement of magnet 5, would result in a compensating signal to motor 50, which may cause a leveling of bridge 40, and certainly would generate a reading indicative of bridge movement from its "o" position, and thereby of the sample's weight.

A torque motor is generally illustrated at 50. This motor would be securd by bolts 51 to a bracket which is bolted to the floor of central housing cavity 31. The motor may be of the taut band movement variety. An acceptable type torque motor or meter movement is marketed by Modutec, Inc., as a model MP7-DUA-100. The struts 43-A and 43-B, and thereby the entire bridge assembly 40, would be secured to a rotatable part of motor 50, preferably to the coil thereof.

Figure 5:
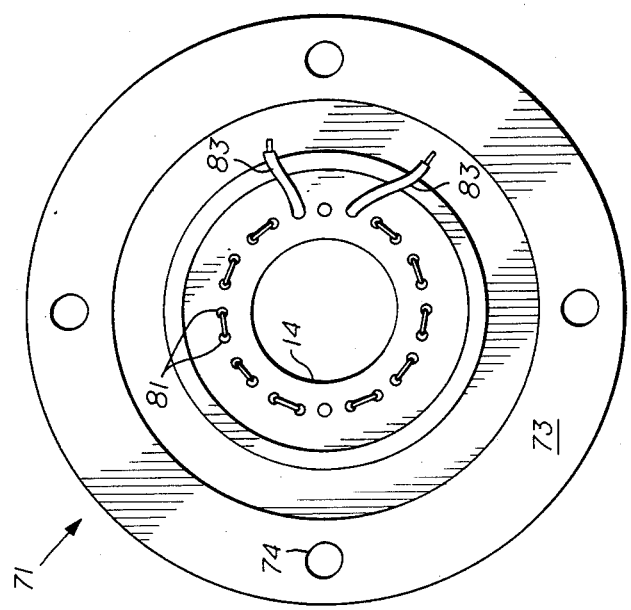
FIG. 5 is a top plan of the heater element.
Figure 4:
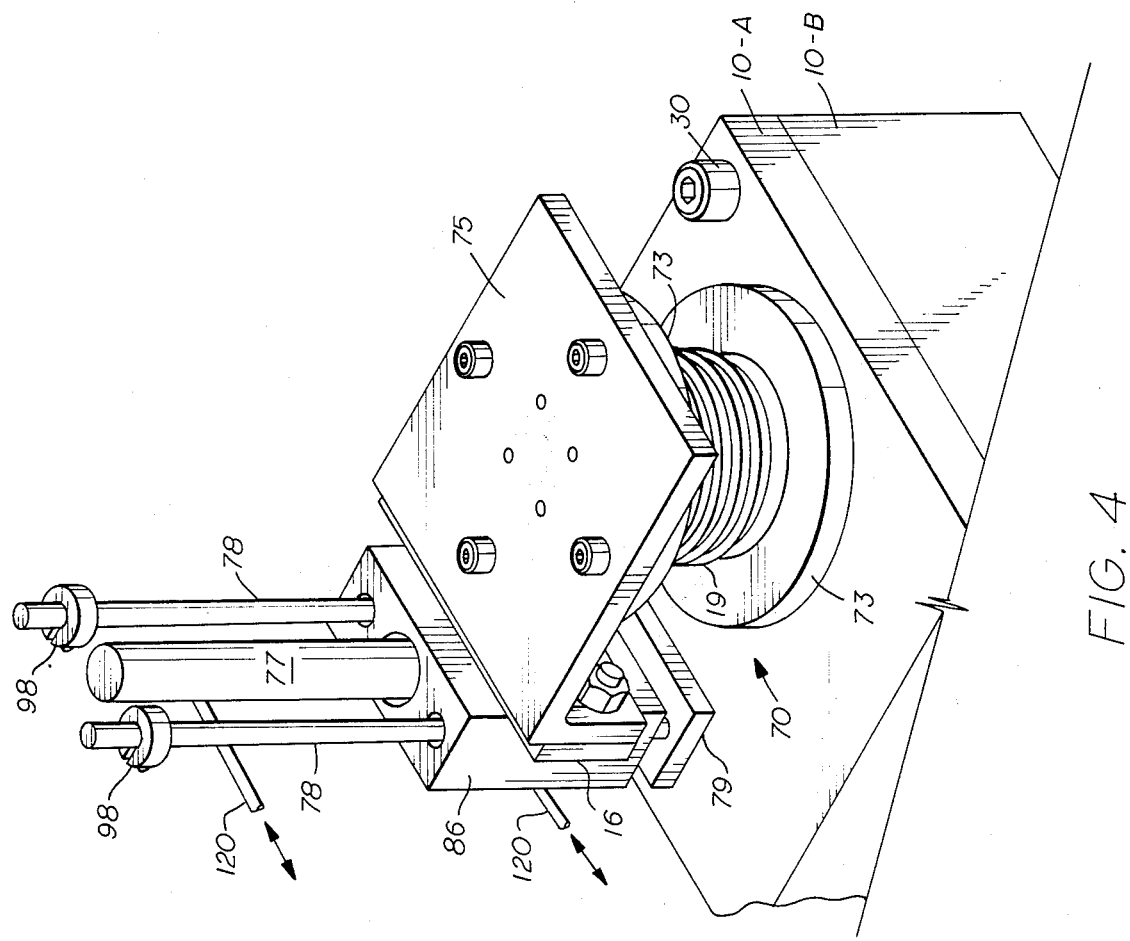
FIG. 4 is a broken perspective of the heater element and lift mechanism therefor.
Figure 6:
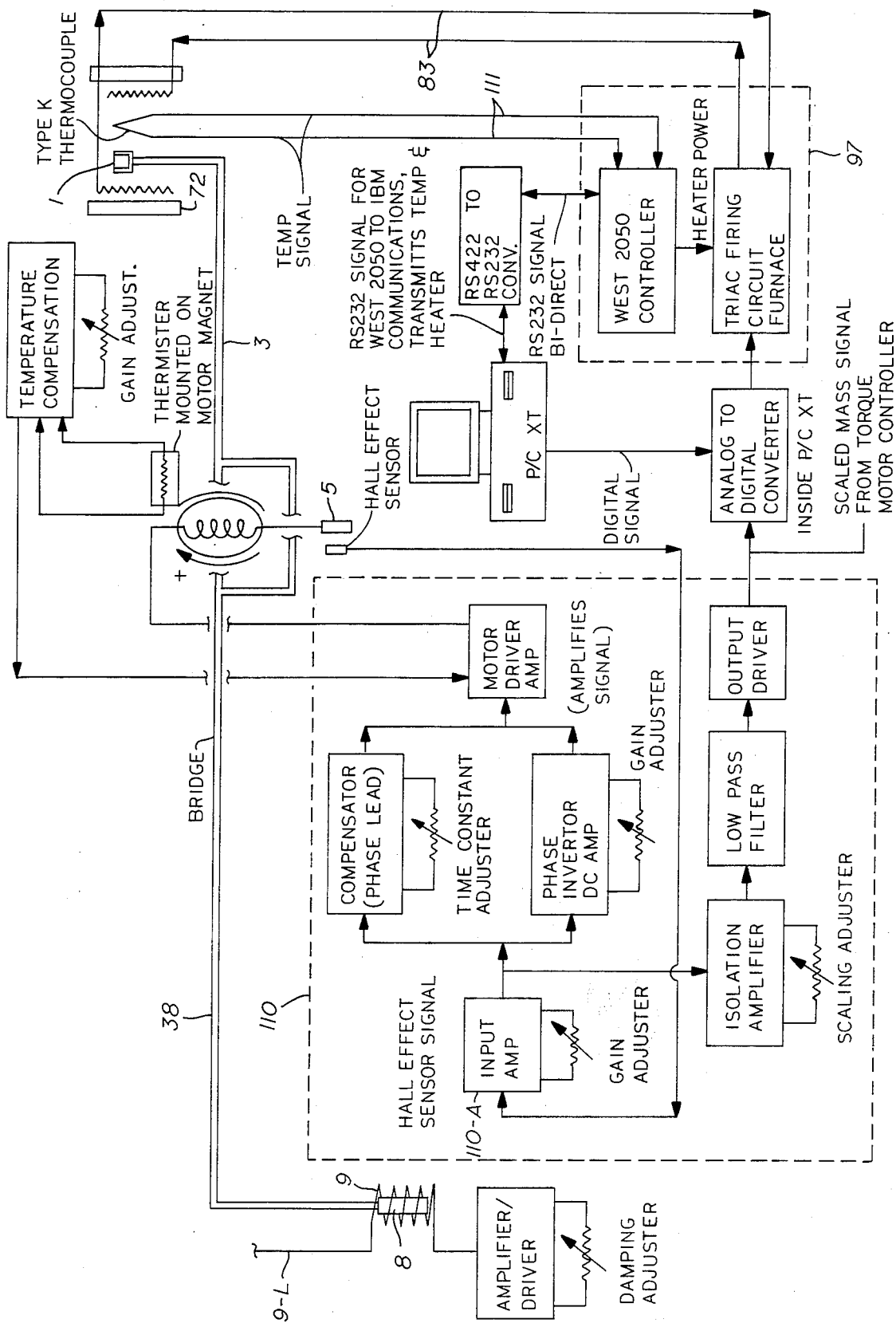
FIG. 6 is generally schematic circuit diagram of the Balance.

Consider now the preferably movable furnace portion in the area of the bridge assembly pedestal 44. Said furnace 70 principally includes drum 71, see FIG. 5. Said drum includes bored central cylinder 72 (see FIG. 1), opposed flanges 73, and opposed annular ledges 14, extending radially interior of bore 98 of cylinder 72. Bolt holes 74 permit securing the drum to both upper housing block 10-A (if desired) and furnace cover 75. Said furnace cover, in turn, may have secured, at its rear wall, traveling block 76 which is secured to actuator housing 86. Said actuator housing is moved by actuator cylinder 77, in any accepted fashion, as by pneumatic fluid from an outside soucrce, through conduits 120, and rides along guide rods 78. Said guide rods and actuator cylinder are secured to upper housing block 10-A, via anchor plate 79, and to fixed, super structure not generally illustrated. Stops 98 limit furnace travel.

The heater element of furnace 70 includes a plurality of aligned pairs of apertures 81 through opposed ledges 14. Vertically aligned, hollow insulated tubes (not shown) are arranged side by side and extend between said ledges. Resistance heating wire 83 serially extends through said tubes, passing in opposite directions in adjacent tubes. The ends of said wire are supplied electrical current from an outside heater controller 97. Two pairs of aligned ledge apertures 81 are not supplied with said heater element tubes. A thermocouple device 16 is positioned within one of such pairs. The cold end thereof would lead to heater controller 97 through conductors 111 for a read out. As a function thereof, said controller 97 would provide needed current to leads 83. Inserted between the other aperture pair is a purge tube 92. One end of said purge tube, extending outwardly of the furnace would be supplied with an inert purge gas or air for combustion from an outside source. A gas passageway 96 in a side wall of said purge tube would direct said gas, supplied by said outside source, to the sample carried by sample container 1. An annular layer of insulation would normally be carried by the inside wall of drum cylinder 72. Cooling coils 19 are helically wrapped around the outside of said drum cylinder. The cooling coil ends are linked to a supply (not shown) of coolant fluid.

Exhaust tube 18 extends through furnace cover 75, for evacuating the volatile products of the thermally decomposing sample.

In operation, with the furnace portion in its elevated position, sample material would be provided to container 1, and it positioned on basket 45, and the basket positioned on pedestal 44. The movable furnace portion would then be lowered by actuator cylinder 77. Thereafter, heater controller 97 would provide current through leads 83 until thermocouple 16 reaches its assigned or programmed level. Measurable thermal decomposition could occur over this temperature range and thereafter. Such weight loss would cause bridge 40 to rotate about the axis of its linkage to motor 50. i.e., the taut-band, carrying a rotatable portion, i.e., the coil, therealong. Such bridge rotation would tend to rotate both magnets 5 and 8, generating a signal by both Hall detectors 6 to bridge controller 110. These signals would cause said controller to generate its responsive signal to the coil of motor 50, causing it to rotate sufficiently to return bridge 40 to its intial position. Such responsive signal would be quantified by controller 110, or by related instrumentation, so as to provide a read out of the weight loss. Current applied to coil 9 by controller 110 would attract or repel magnet 8, for purposes of damping and/or taring.

Although only a single embodiment has been described, it should be obvious that numerous modifications would be possible by one skilled in the art without departing from the spirit of the invention, the scope of which is limited only by the following claims.

I claim:
1. Balance apparatus comprising:
opposed 1st and 2nd beams;
said 1st beam including means for supporting a sample to be examined;
said 2nd beam including, in conjunction with a first signal generating external coil, balance dampening means, said 2nd beam's dampening means including a depending first magnet;
said 1st and 2nd beams being joined by a cradlecarrying bridge member, said bridge member including a depending second magnet;
motor means supporting of said bridge member; and means for causing said motor means to compensate or weight change in said sample, said compensation causing means including means for receiving said first signal, means for receiving a second signal generated by said magnet in conjunction with at least a pair of Hall Detectors external thereto, and means for translating said first and second signals into motor activation.

2. Balance apparatus comprising:
opposed 1st and 2nd beams; said 1st beam including means for supporting a sample to be examined; said 1st and 2nd beams joined by connector means; and
heater means for regulating the temperature of said sample, said heater means being movable from a 1st position encompassing said sample to a 2nd position exposing said sample.

3. The balance of claim 2 wherein said heater means includes electrical conductors and a cooling coil secured to a heater housing.

4. Balance apparatus comprising:
opposed 1st and 2nd beams; said 1st beam including means for supporting a sample to be examined;
said 1st and 2nd beams being joined by connector means; heater means for regulating the temperature of said sample, said heater means including electrical conductors secured to a heater housing; and cooling coil also secured to said heater housing.

5. Balance apparatus comprising:
opposed 1st and 2nd beams; said 1st beam including means for supporting a sample to be examined;
said 1st and 2nd beams being joined by connector means;
motor means supporting said connector means, and means for causing said motor means to compensate for weight change in said sample;
heater means for regulating the temperature of said sample; said compensation causing means including means for generating a signal to said motor means as a function of a change in weight of said sample; and
said heater means is movable from a 1st position encompassing said sample to a 2nd position exposing said sample.

6. The balance of claim 5 wherein:
said magnetic means comprises a magnet depending from said connector means; and
said heater means includes electrical conductors secured to a heater housing.

7. The balance of claim 5 wherein:
said magnetic means comprises a magnet provided said 2nd beam; and said heater means also includes a cooling coil secured to said heater housing.

8. The balance of claim 5 wherein:
said magnetic means comprises a 1st magnet provided said connector means and a 2nd magnet provided said 2nd beam; and
said heater means includes electrical conductors and a cooling coil secured to a heater housing.

* * * * *